(12) United States Patent
Katsumata et al.

(10) Patent No.: US 6,337,354 B1
(45) Date of Patent: Jan. 8, 2002

(54) INK WASTAGE ABSORBER AND INK SUPPORTER

(75) Inventors: Yoshihiro Katsumata; Hideya Kinoshita, both of Yokohama (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/630,716

(22) Filed: Aug. 2, 2000

(30) Foreign Application Priority Data

Aug. 3, 1999 (JP) .......................................... 11-219465
Aug. 3, 1999 (JP) .......................................... 11-219466

(51) Int. Cl.$^7$ .................................................. C08J 9/40
(52) U.S. Cl. ........................ 521/52; 521/170; 521/125; 521/918; 347/31; 347/87; 428/310.5
(58) Field of Search ........................ 521/52, 170, 918, 521/125; 347/31, 87; 428/310.5

(56) References Cited

U.S. PATENT DOCUMENTS

| | | | | |
|---|---|---|---|---|
| 4,670,477 A | * | 6/1987 | Kelly et al. | .................... 521/52 |
| 5,182,579 A | * | 1/1993 | Haruta et al. | ........... 346/140 R |
| 5,466,482 A | * | 11/1995 | Johnson | ...................... 427/212 |

* cited by examiner

*Primary Examiner*—James J. Seidleck
*Assistant Examiner*—Melanie Bagwell
(74) *Attorney, Agent, or Firm*—Sughrue Mion, PLLC

(57) ABSTRACT

An ink wastage absorber is made from a flexible polyurethane foam having an air-permeability of 1.0 cc/cm$^2$/sec or more, or is made from a flexible polyurethane foam produced by using a foamable raw material containing a polyol, an isocyanate, a catalyst, and a foaming agent, wherein the polyurethane foam is impregnated with a surface active agent. An ink supporter includes an ink permeation member provided at a portion corresponding to a printer head and an ink absorbing member being in contact with the ink permeation member.

13 Claims, No Drawings

INK WASTAGE ABSORBER AND INK SUPPORTER

BACKGROUND OF THE INVENTION

The present invention relates to an ink wastage absorber and an ink supporter capable of improving the absorptivity for pigment ink or dye ink.

In recent years, along with the widespread use of personal computers, various kinds of printers have been available. The printing mechanism of these printers has been recently shifted from the wire-dot mode or ink-ribbon mode to the laser mode or ink-jet mode. In particular, the ink-jet mode lower in cost than the laser mode has been widely used. Dye ink has been generally used for the ink-jet type printer; however, along with the recent trend toward color printing, pigment ink has come to be used.

In the ink-jet type printer, excess ink which is accumulated in the printer by cleaning a printer head may flow therefrom and contaminate a portion near the printer head. To cope with such an inconvenience, an ink absorbing member for absorbing excess ink is laid at a portion corresponding to the printer head.

The ink absorbing has been initially made from non-woven fabric of pulps or fibers; however, since it has presented a problem associated with scattering of fibers due to fuzzing, a flexible polyurethane foam has recently come to be widely used. Along with the shifting from dye ink to pigment ink, attempts have been made to improve the ink absorptivity of the flexible polyurethane foam. In particular, since pigment ink is used in a state in which fine particles of, for example, a carbon as a pigment are dispersed in a solvent, it is different in ink absorptivity from dye ink. And, the conventional ink absorbing member may be clogged with particles of carbon or the like, thereby failing to sufficiently achieve the absorbing ability thereof.

Further, along with the demand toward the miniaturization and lightweightness of a printer, it becomes difficult to lay the ink absorbing member at a position being directly in correspondence with a printer head. To solve such a problem, there is adopted a method of laying the ink absorbing member at a position slightly separated from a printer head, and connecting the ink absorbing member to the printer head by means of an ink permeation member having a good ink absorptivity. In view of the foregoing, it is expected to provide an ink wastage absorber used as an ink permeation member or an ink absorbing member, which is further improved in its performance.

SUMMARY OF THE INVENTION

An object of the present invention is to provide an ink wastage absorber having a good ability of absorbing dye ink or pigment ink, and a production process thereof.

Another object of the present invention is to provide an ink supporter including an ink permeation member and an ink absorbing member.

To achieve the above object, according to a first aspect of the present invention, there is provided an ink wastage absorber made from a flexible polyurethane foam having an air-permeability of 1.0 $cc/cm^2/sec$ or more.

According to a second aspect of the present invention, there is provided an ink wastage absorber having a good ink absorptivity, which is made from a flexible polyurethane foam produced by using a foamable raw material for flexible polyurethane foam containing a polyol, an isocyanate, a catalyst, and a foaming agent, wherein the flexible polyurethane foam is impregnated with a surface active agent. The surface active agent is preferably sodium succinate.

According to a third aspect of the present invention, there is provided a process of producing an ink wastage absorber having a good ink absorptivity, which includes the steps of: preparing a flexible polyurethane foam by using a foamable raw material for flexible polyurethane foam containing a polyol, an isocyanate, a catalyst, and a foaming agent, and compressing the flexible polyurethane foam as needed; dipping the flexible polyurethane foam or the compressed foam in water in which a surface active agent is dispersed; and squeezing water from the flexible polyurethane foam thus treated and then drying the flexible polyurethane foam, to make the surface active agent adhere on the surface of the flexible polyurethane foam.

The ink wastage absorber can be applied to any one of the ink permeation member or the ink absorbing member provided at a portion corresponding to a printer head, or the ink absorbing member being in contact with the ink permeation member.

The ink wastage absorber of the present invention has a good ink (particularly, pigment ink) absorptivity, which is equal to or more than that of the existing ink absorbing member made from pulps or felts. The ink absorbing member made from pulps or felts is intended to improve the ink absorptivity by making use of the pillar phenomenon; however, if such an ink absorbing member is used for absorption of pigment ink, it may be clogged with particles of, for example, carbon as a pigment component, with a result that the absorbing ability of the member be significantly degraded.

To cope with such an inconvenience, the ink absorbing member is required to have an ability of readily absorbing and supporting pigment ink, and further the ink permeation member as a bridging member to the ink absorbing member must be smaller in pillar effect than the ink absorbing member for preventing the occurrence of clogging of ink upon drying (upon no use of the member) or a failure in absorption. In view of the foregoing, the ink wastage absorber of the present invention is intended to improve the absorptivity for pigment ink by impregnating a surface active agent in the main body of the ink wastage absorber.

According to a fourth aspect of the present invention, there is provided an ink supporter including: an ink permeation member provided at a portion corresponding to a printer head, the ink permeation member being obtained by producing a flexible polyurethane foam by using a foamable raw material for flexible polyurethane foam containing a polyol, an isocyanate, a catalyst, and a foaming agent, and making the flexible polyurethane foam contain a surface active agent; and an ink absorbing member being in contact with the ink permeation member, the ink absorbing member being obtained by producing a flexible polyurethane foam by using a foamable raw material containing a polyol, an isocyanate, a catalyst, and a foaming agent, and thermally compressing the flexible polyurethane foam at a compression magnification of 2 to 20 times by a hot press. The ink absorbing member preferably contains a surface active agent.

The ink supporter having the above configuration exhibits a feature capable of readily absorbing and supporting ink, particularly, pigment ink. To be more specific, if the ink permeation member provided at a portion corresponding to a printer head is formed of an absorbing member having a good ink absorptivity due to the capillary phenomenon, which is obtained by hot-pressing a flexible polyurethane foam, such an ink permeation member may be clogged with particles of, for example, carbon as a pigment component, with a result that absorbing ability be significantly degraded.

Accordingly, the ink permeation member requires the ability of readily absorbing and supporting pigment ink, and also it must be lower in capillary effect than the ink absorbing member as a main body for preventing the occurrence of clogging of ink upon drying (upon no use of the member) and a failure in absorption. For this reason, according to the present invention, the flexible polyurethane foam for forming the ink permeation member is impregnated with a surface active agent for improving the absorptivity for pigment ink.

On the other hand, the ink absorbing member is thermally compressed, and is preferably made to contain a surface active agent, to thereby ensure a good ink absorptivity as well as a good ink supporting ability.

DETAILED DESCRIPTION OF THE PREFERRED EMBODIMENT

The present invention provides an ink supporter including an ink permeation member provided at a portion corresponding to a printer head and an ink absorbing member being in contact with the ink permeation member, wherein ink which has flowed out of a printer head permeates in the ink permeation member, being absorbed in the ink absorbing member through the ink permeation member, and is supported by the ink absorbing member.

The present invention also provides an ink wastage absorber. According to the present invention, the wording "an ink wastage absorber" includes the above ink absorbing member and the above ink permeation member. It should be noted that the ink absorbing member can be used in the state being directly in correspondence with a printer head as needed, and in this case, the use of the ink permeation member is omitted.

Each of the above ink permeation member and the ink absorbing member is made from a flexible polyurethane foam produced by using a foamable raw material for flexible polyurethane foam containing a polyol, an isocyanate, a catalyst, a foaming adjusting agent, and a foaming agent.

As the polyol, there is preferably used poly-(oxyethylene-oxyalkylene) polyetherpolyol in which ethylene oxide and an alkylene oxide component other than ethylene oxide are added to an active hydrogen-containing compound having two or more functional groups. Here, examples of the alkylene oxide components include propylene oxide, butylene oxide, and styrene oxide; and examples of the active hydrogen-containing compound used for producing the above polyol include a polyalcohol and a polyamine. Examples of the polyalcohols include ethylene glycol, propylene glycol, glycerine, trimethylol propane, 1,2,6-hexane triol, pentaerythritol, sorbitol, and saccharose.

According to the present invention, a metal salt of an organic acid having a hydrophilic property may be blended to a polyol generally used for producing a flexible polyurethane foam. As the metal for the metal salt of an organic acid, there may be effectively used potassium, sodium, magnesium, tin, copper, lithium, or silver, preferably, potassium or sodium.

The organic isocyanate used for reaction with the polyol is not particularly limited but may be toluenediisocyanate, phenylenediisocyanate, diphenylmethanediisocyanate, or 4,4'-diphenyldiisocyanate. Of these isocyanates, a mixture of a 2,4-isomer and a 2,6-isomer of toluenediisocyanate at a mixing ratio of 80:20 or 65:35 is preferably used in terms of economy. The amount of the organic isocyanate to the total amount of the polyol and the other active hydrogen-containing compound, that is, the isocyanate index may be in a range of 80 to 130, preferably, 100 to 110.

As the catalyst, there is used an organic tin compound catalyst or an amine based catalyst. Examples of the organic tin compound catalysts include stannous octoate, stannous oleate, dibutylditinlaurate, dibutyltindi-2-ethylhexoate, and dibutyltindiacetate. Examples of the amine based catalysts include generally used amine based catalysts, for example, triethylamine, triethylenediamine, N-ethylmorpholine, dimethylethanolamine, dimethylbenzylamine, 1,8-diazabicyclo(5.4.0)undecene-7 and its phenol salt, and triethylenediamine formate. These catalysts may be used singly or in combination of two kinds or more. In addition. as the amine based catalyst suitable for the flexible polyurethane foam of the present invention, there is generally used an amine based catalyst which is generally used for forming a flexible polyurethane foam; however, an amine based catalyst having a reactivity is preferably used for an application with a problem associated with elution or the like. The content of the catalyst is not particularly limited but may be generally in a range of 0.005 to 2 parts by weight on the basis of the 100 parts by weight of the polyol.

As the foaming adjusting agent, there is used a silicone surfactant generally used for forming a flexible polyurethane foam; however, a foaming adjusting agent having a reactivity may be preferably used for an application with a problem associated with elution or the like. The content of the foaming adjusting agent is set in a range of 0.1 to 3.0 parts by weight, preferably, 0.5 to 2.0 parts by weight on the basis of 100 parts by weight of the polyol.

As the foaming agent, there is used water, methylene chloride, or a volatile liquid having a low boiling point.

To satisfy the performance required for the flexible polyurethane foam, in addition to the above-described components, a filler, an antistatic agent, a coloring agent, or a flame retarder may be added to the flexible polyurethane foam without departing from the scope of the present invention.

If the flexible polyurethane foam requires a higher hardness, a cross linking agent or the like may be of course added to the foamable raw material for increasing the hardness thereof.

The flexible polyurethane foam can be produced from the above-described foamable raw material in accordance with a known process.

The density of the flexible polyurethane foam is set in a range of 0.005 to 0.150 $g/cm^3$, preferably, 0.01 to 0.05 $g/cm^3$, and the number of cells of the polyurethane foam is set in a range of 40 to 150 pieces/25 mm, preferably, 60 to 150 pieces/25 mm. To be more specific, in the case of using the flexible polyurethane foam in the compressed state, the number of cells of the polyurethane foam is set in a range of 20 to 150 pieces/25 mm, preferably, 40 to 150 pieces/25 mm.

According to the first aspect of the present invention, the flexible polyurethane foam, which may be used either in the non-compressed state or in the compressed state, is characterized in that the air-permeability thereof is in a range of 1.0 or more, preferably, 5.0 to 300, more preferably, 10 to 300, most preferably, 20 to 300 $cc/cm^2/sec$.

The flexible polyurethane foam having an air-permeability less than 1.0 $cc/cm^2/sec$ is poor in its ink absorbing performance, and therefore, it cannot achieve the object of the present invention. It should be noted that the above air-permeability is measured by the method specified under JIS L 1004.

The density, the number of cells, the diameter of each cell, and a porosity of the flexible polyurethane foam having the above air-permeability can be suitably selected; however, it is effective to use the reticulated flexible polyurethane foam with no cell membranes. The reticulated flexible polyurethane foam with no cell membranes can be produced in accordance with a process of preparing a flexible polyurethane foam with cell membranes by a usual manner, and removing the cell membranes, or a process of producing a flexible polyurethane foam by a manner not to form cell membranes.

The flexible polyurethane foam is, as described above, used either in the non-compressed foam or in the compressed foam. In this case, the compression magnification is set in a range of 1 to 20 times. The state in which the compression magnification is one time means the non-compressed state. Accordingly, the compressed foam may be obtained by slightly compressing the non-compressed foam; however, in general, it is obtained by compressing the non-compressed foam at a compression magnification ranging from 2 to 20, preferably, 5 to 10, more preferably, 8 to 10 times. The compression of the polyurethane foam is not particularly limited but may be generally performed by a hot-press process. The hot-press process includes the steps of compressing the flexible polyurethane foam at a specific magnification by hot platens heated at a temperature of about 150 to 240° C., and keeping such a state until the compressed state is fixed at the compression magnification. The hot-press time is not particularly limited but may be generally set in a range of 2 to 20 min.

With respect to the compressed flexible polyurethane foam, as the compression magnification becomes larger, the capillary effect becomes larger, but the density becomes high and thereby the ink supporting ability becomes lower. Accordingly, in practical use of the polyurethane foam, the density and the compression magnification thereof must be set with a good balance kept therebetween. For example, the ink absorbing member being in contact with the ink permeation member is required to be made higher in capillary effect (that is, ink suction rate and ink suction height) than the ink permeation member, and further the ink absorbing member is required to ensure a sufficient ink absorbing capacity and to prevent occurrence of clogging of ink and a failure in absorption. In consideration of these conditions, the number of cells, the compression magnification, and the air-permeability of the polyurethane foam used for the ink absorbing member must be selected.

In the case of using the ink wastage absorber of the present invention as the ink absorbing member being in contact with the ink permeation member, the ink wastage absorber may be made from a plurality of layers different in air-permeability, wherein the plurality of layers are stacked such that the ink absorptivity becomes higher at a position closer to the ink absorbing side and the ink supporting ability becomes higher at a position farther from the ink absorbing side, that is, the air-permeability on the ink absorber side is low and becomes gradually higher at a position farther from the ink absorbing side.

The formation of the plurality of layers may be concretely performed by stacking two to six layers, particularly, three to five layers different in compression magnification and/or number of cells. Further, to form a plurality of layers different in compression magnification and/or number of cells, the hot- compression may be made in a state In which the hot-platen is pressed on only one surface of the foam.

The ink absorptivity of the ink wastage absorber can be enhanced by slitting the surface, on the ink absorbing side, of the ink wastage absorber. To be more specific, the slits, spaced at intervals of 2 to 50 mm, particularly, 5 to 10 mm, are provided in parallel or in a grid pattern.

According to the present invention, a surface active agent can be impregnated in or made to adhere on the above-described flexible polyurethane foam (non-compressed foam or compressed foam) for further improving the ink absorptivity.

As the surface active agent, there is used an anionic surface active agent such as ethylene oxide, an alkali salt of higher fatty acid, or alkylsulfonate; a cationic surface active agent such as a higher amine haloganate, or a quaternary ammonium salt; a nonionic surface active agent such as polyethyleneglycolalkylether, or sorbitan fatty acid ester; or an amphoteric surface active agent such as amino acid. In particular, a denaturated sodium succinate is preferable in terms of effect. According to the present invention, as the denaturated sodium succinate, there is preferably used sodium dialkylestersulfosuccinate expressed by the following expression:

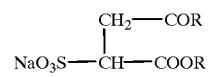

where R is an alkyl group or aralkyl group having the carbon number of 1 to 18.

Examples of the esters include di-n-amyl, di-n-hexyl, di-n-heptyl, di-n-octyl, di-n-nonyl, monoethylmonododecyl, monobutylmonododecyl, mono-2-ethylhexyl-mono-1-methylbenzyl, mono-2-ethylhexyl-mono-1-methyl-4-ethylhexyl, di-1-methylbutyl, di-2-methylbutyl, di-isoamyl, di-1,3-dimethylbutyl, di-1-methylamyl, di-dimethylamyl, di-1-isopropylisobutyl, di-1-propylbutyl, di-1-methylhexyl, di-2-ethylhexyl, di-1-methylheptyl, di-1-butylamyl, di-1-isobutyl-3-methylbutyl, di-1-methyl-4-ethylhexyl, and di-1-methyl-4-ethyloctyl.

Such a surface active agent may be of a water-soluble type. This is because if a water-soluble surface active agent is used, the polyurethane foam may be only dried after being impregnated with the water-soluble type surface active agent. The content of the surface active agent differs depending on the required performance of the flexible polyurethane foam. However, in the case of using the denaturated sodium succinate as the surface active agent, the content thereof is set in a range of 1 to 500,000 g, preferably, 1,000 to 20,000 g per 1 $m^3$ of the flexible polyurethane foam.

The surface active agent can be made to adhere on the flexible polyurethane foam by a process of dipping the non-compressed or compressed foam in water in which the surface active agent has been dispersed or dissolved, squeezing the water from the non-compressed or compressed foam thus treated, and drying the non-compressed or compressed foam.

The ink wastage absorber of the present invention configured as described above has effects that the absorber has an ability of uniformly, accurately absorbing a large amount of ink, and the absorber is usable in a state being cut into a shape matched to a complicated set-up position in a printer and thereby can be made low in cost, and that since the absorber is made from the flexible polyurethane foam, it can eliminate the occurrence of the fuzzing of felts or the like and also eliminate the occurrence of the inconvenience that the function of the printer is affected by feathers fallen in the printer.

The ink supporter of the present invention configured as described above has effects that the ink absorbing performance is not degraded after the ink is dried, and even if ink overflows, the ink is reabsorbed from an introducing portion, that is, the ink can be perfectly absorbed, and that the ink absorbing rate in the vertical direction can be adjusted, as needed, by providing slits or pins in or on the ink supporter in the vertical direction.

The present invention will be described in detail by way of, but not limited thereto, the following experimental examples:

EXPERIMENT I

Ink wastage absorbers as Inventive Examples 1 and 2 and Comparative Examples 1 to 3 were produced in the following manner.

The composition of each of a flexible polyurethane foam used for inventive examples and a polyurethane foam used for comparative examples (as conventional absorbing members) was as follows: 100 parts by weight of a polyol (trade name: V3030, produced by Dow Chemical Japan Limited), 50 parts by weight of toluenediisocyanate (trade name: TD180, produced by Nippon Polyurethane Industry Co., Ltd.), 4 parts by weight of water, 0.3 part by weight of an amine based catalyst (trade name: DABCO-33LV, produced by Mitsui Air Product Co., Ltd.), tin catalyst (stannous octoate, produced by Nitto Kasei Co., Ltd.) in an amount shown in Table 1, and 1 part by weight of a silicone surfactant (trade name: L-520, produced by Nippon Unicar Co., Ltd.). A flexible polyurethane foam was produced by a one-shot process using the above raw material. Then, the resulting flexible polyurethane foam was heat pressed at the compression magnification shown in Table 1.

The performances of the ink wastage absorbers thus produced were evaluated. The results are shown in Table 1.

TABLE 1

|  | Inventive Example 1 | Inventive Example 2 | Comparative Example 1 | Comparative Example 2 | Comparative Example 3 |
|---|---|---|---|---|---|
| Amount of tin catalyst (part by weight) | 0.3 | 0.3 | 0.35 | 0.4 | — |
| Compression Magnification | ×5 | ×10 | ×5 | ×5 | — |
| Air-permeability (cc/cm²/sec) | 2.8 | 1.8 | 0.8 | 0.1 | 10.2 (pulp) |
| Absorbing Time *1) | 6.6 sec | 4.2 sec | 20.6 sec | 100 sec | 1 sec |
| Slitting *2) | 3.9 sec | 2.0 sec | 6.8 sec | 7.0 sec | — |
| Suction Height (mm) *3) | 110 | 190 | 85 | 70 | 150 |

*1) Ink of 1 cc was discharged for about 4 seconds on a drain sheet placed in the horizontal direction by using an injector, and an ink absorption time elapsed until the discharged ink was perfectly absorbed was measured.
*2) Four slits arranged with a pitch of 5 mm were formed.
*3) A sample [10 mm (longitudinal width) × 10 mm (lateral width) × 200 mm (length)] was dipped in ink with a height of 10 mm, and a suction height of ink from the ink plane was measured.

EXPERIMENT II

Production of Foam

The composition of each of a flexible polyurethane foam used for inventive examples and a polyurethane foam used for comparative examples (as conventional absorbing members) was as follows: 100 parts by weight of a polyol (trade name: V3030, produced by Dow Chemical Japan Limited). 50 parts by weight of toluenedulsocyanate (trade name: TD180, produced by Nippon Polyurethane Industry Co., Ltd.), 4 parts by weight of water, 0.3 part by weight of an amine based catalyst (trade name: DABCO-33LV, produced by Mitsui Air Product Co., Ltd.), 0.3 part by weight of tin catalyst (stannous octoate, produced by Nitto Kasei Co., Ltd.), and 1 part by weight of a silicone surfactant (trade name: L-520, produced by Nippon Unicar Co., Ltd.). A flexible polyurethane foam was produced by a one-shot process using the above raw material. The density of the flexible polyurethane foam was 0.020 g/cm³ (measured by a method specified under JIS-K6400), and the number of cells thereof was 55 pieces/25 mm.

The foam having a size of 10 mm×100 mm×100 mm was dipped in water in which sodium di-(normal octyl) sulfosuccinate was dissolved, and then taken up from the water, followed by squeezing water therefrom, and dried by heating. This foam was taken as Inventive Example 3. The amount of sodium di-(normal octyl) sulfosuccinate adhering on the foam was 30 kg/m³. On the other hand, the foam which was not impregnated with sodium di-(normal octyl) sulfosuccinate was taken as Comparative Example 4.

Absorption Test

The foams in Inventive Example 3 and in Comparative Example 4 were subjected to the following absorbing test:

(1) Pigment ink of 0.1 cc was dropped on the test piece, and the suction rate (in second) of the pigment ink was measured. As a measurement result, it took less than one second for the foam in Inventive Example 3 to absorb the pigment ink, while it took 60 seconds or more for the foam in Comparative Example 4 to absorb the pigment ink.

(2) The dropping of pigment ink of 0.1 cc on the test piece was repeated by 10 times, and the suction rate (in second) of the pigment ink was measured. As a measurement result, it took less than one second for the foam in Inventive Example 3 to absorb the pigment ink, while it took 60 seconds or more for the foam in Comparative Example 4 to absorb the pigment ink.

Absorbing State (3) As a result of examining the absorbing state of the foam in Inventive Example 3, it was confirmed that the foam absorbed the pigment ink in a columnar shape extending in the vertical direction from the drop position of ink to the bottom of the test piece, and thereby any clogging of the pigment ink was not observed.

For the foam in Comparative Example 4, a clogged layer was formed on the surface portion of the foam, and the ink drop point was spread and the ink did not reach the bottom of the foam. This means that the foam in Comparative Example 4 was poor in ability of readily absorbing ink and thereby it was undesirable as a member bridged to another ink absorbing member.

EXPERIMENT III

The foam obtained in the same manner as in Experiment II and having a size of 50 mm×100 mm×100 mm was hot-pressed for 300 seconds by using hot platens heated at 200° C., to obtain a compressed foam having a compression magnification of 5 times and a size of 10mm×10 mm×100 mm.

The compressed foam was impregnated with sodium di-(normal octyl) sulfosuccinate in the same manner as that described in Experiment II. The amount of sodium di-(normal octyl) sulfosuccinate adhering on the foam was 30 kg/m$^3$. This foam was taken as Inventive Example 4. On the other hand, the foam which was not impregnated with sodium di-(normal octyl) sulfosuccinate was taken as Comparative Example 5.

The compressed foams in Inventive Example 4 and Comparative Example 5 were subjected to the following absorbing test:

(1) Pigment ink of 0.1 cc was dropped on the test piece, and the suction rate (in second) of the pigment ink was measured. As a measurement result, it took less than one second for the compressed foam in Inventive Example 4 to absorb the pigment ink, while it took 20 seconds for the compressed foam in Comparative Example 5 to absorb the pigment ink.

(2) The dropping of pigment ink of 0.1 cc on the test piece was repeated by 10 times, and the suction rate (in second) of the pigment ink was measured. As a measurement result, it took less than one second for the foam in Inventive Example 4 to absorb the pigment ink, while it took 15 seconds for the foam in Comparative Example 5 to absorb the pigment ink.

EXPERIMENT IV

Production of Foam

The composition of each of a flexible polyurethane foam used for inventive examples and a polyurethane foam used for comparative examples (as conventional absorbing members) was as follows: 100 parts by weight of a polyol (trade name: V3030, produced by Dow Chemical Japan Limited), 50 parts by weight of a toluendulsocyanate (trade name: TD180, produced by Nippon Polyurethane Industry Co., Ltd.), 4 parts by weight of water, 0.3 part by weight of an amine based catalyst (trade name: DABCO-33LV, produced by Mitsui Air Product Co., Ltd.), 0.3 part by weight of a Tin catalyst (stannous octoate, produced by Nitto Kasei Co., Ltd.), and 1 part by weight of a silicone foaming adjusting agent (trade name: L-520, produced by Japan Unicar Co., Ltd.). A flexible polyurethane foam was produced by a one-shot process using the above raw material. The density of the polyurethane foam was 0.020 g/cm$^3$ (measured by a method specified under JIS-K6400), and the number of cells thereof was 50 pieces/25 mm.

The polyurethane foam having a size of 10 mm×100 mm×100 mm was dipped in water in which sodium di-(normal octyl) sulfosuccinate was dissolved, and then taken up from the water, followed by squeezing of water therefrom, and dried by heating. This foam was taken as an ink permeation member A1. The amount of sodium di-(normal octyl) sulfosuccinate adhering on the foam was 30 kg/m$^3$.

The flexible polyurethane foam having a size of 10 mm ×100 mm×100 mm was hot-pressed to obtain a compressed foam having a compression magnification of 10 times. The foam was impregnated with sodium di-(normal octyl) sulfosuccinate in the same manner as described above, to obtain an ink absorbing member A2. These members A1 and A2 were taken as Inventive Examples 5-1 and 5-2. The amount of sodium di-(normal octyl) sulfosuccinate adhering on the foam was 30 kg/m$^3$.

On the other hand, the foam not impregnated with sodium di-(normal octyl) sulfosuccinate was taken as a foam B1, and the foam compressed at a compression magnification of 10 times by hot-press for improving the ink absorptivity due to the capillary effect was taken as a foam (B2). These foams B1 and B2 were taken as Comparative Examples 6-1 and 6-2. The foams A1 and A2 as Inventive Examples 5-1 and 5-2 and the foams B1 and B2 as Comparative Examples 6-1 and 6-2 were subjected to the following tests:

Test for Ink Permeation Member (1) Pigment ink of 0.1 cc was dropped on the foam, and the suction rate (in second) of the pigment ink was measured. As a measurement result, it took less than one second for the ink permeation member A1 as Inventive Example 5-1 to absorb the pigment ink, while it took 60 seconds or more for the foam B1 as Comparative Example 6-1 to absorb the pigment ink.

(2) The dropping of pigment ink of 0.1 cc on the foam was repeated by 10 times, and the suction rate (in second) of the pigment ink was measured. As a measurement result, it took less than one second for the ink permeation member A1 as Inventive Example 5-1 to absorb the pigment ink, while it took 60 seconds or more for the foam B1 of Comparative Example 6-1 to absorb the pigment ink.

Absorbing State (3) As a result of examining the absorbing state of the ink permeation member A1 as Inventive Example 5-1, it was confirmed that the foam absorbed the pigment ink in a columnar shape extending in the vertical direction from the drop position of ink to the bottom of the test piece. The same is true for the ink absorbing member A2 as Inventive Example 5-2. For the foam B2 as Comparative Example 6-2, a clogged layer was formed on the surface portion of the foam, and the dropped pigment ink was spread and accumulated and the ink did not reach the bottom of the foam. The foam B1 as Comparative Example 6-1 did not absorb the pigment ink at all and the ink layer was formed on the surface of the foam B1, and therefore, the foam B1 did not include any function as the ink absorbing member. This means that each of the foams B1 and B2 as Comparative Examples 6-1 and 6-2 was poor in ability of readily absorbing ink and thereby such a foam was undesirable as an ink permeation member bridged to another ink absorbing member.

Absorption Test (1) for Ink Supporter

The absorption test was performed by putting pigment ink in a tray, and the ink absorbing member having a size of 10 mm×100 mm×200 mm was vertically dipped in the pigment ink in such a manner that the dipping depth of the member became 10 mm. In such a state, the ink suction height for a specific time was measured.

As the ink absorbing member of the present invention, there was used the foam A2 as Inventive Example 5-2 obtained by thermally compressing the above polyurethane foam A1 as Inventive Example 5-1 at a thermal compression magnification of 10 times. For the foam A2 as Inventive Example 5-2, the suction height after an elapse of one hour was 60 mm, and the suction height after an elapse of 24 hours was 120 mm. For the foam B2 as Comparative Example 6-2, the suction height after an elapse of one hour was 40 mm, and the suction height after an elapse of 24 hours was 70 mm. In addition, for a felt member generally used, the suction height after an elapse of one hour was 55 mm, and the suction height after an elapse of 24 hours was 60 mm.

From the above-described data, the ink absorbing rate can be increased by providing an ink absorbing member formed by compression at a high thermal compression magnification on an upper portion of the ink permeation member, and also the absorbed amount and the absorption rate of the ink absorbing member can be determined by thermal compression of the urethane foam for forming the ink absorbing member. As a result, unlike the conventional felt or pulp member, the ink absorbing member can be freely designed in terms of absorbed amount and absorbing rate.

Absorption Test (2) for Ink Supporter

The ink absorbing member was subjected to an absorption test in a state similar to the actual state. To be more specific, the ink absorbing member was stacked on the ink permeation member while being shifted from the ink permeation member by a half, and pigment ink was dropped on the ink permeation member and absorbed In the ink permeation member. The dropping of 3 cc of pigment ink was repeated by 5 times (equivalent to 60% of absorbing volume) at the beginning stage, followed by sufficient drying, and the dropping of 3 cc of pigment ink was repeated again by 3 times. The test results are shown in Table 2.

TABLE 2

|  | Ink Supporter as Inventive Example 5 | Felt Member as Comparative Example 6 |
|---|---|---|
| Initial Absorbing Test | No over-flow | Over-flow after drop of 13 cc |
| State After Drying | No abnormality No ink solidified portion | Solidification of ink on ink permeation member Deterioration of absorbing performance |
| Reabsorbing Test (9 cc) | Over flow after drop of 7 cc of ink | Overflow without absorption of ink |

In Inventive Example 5, the foam A1 was used as the ink introducing portion and the foam A2 is used for the ink absorbing member. The ink having permeated in the introducing portion is readily moved to the ink absorbing member, so that no ink remain in the ink introducing portion and the ink is readily diffused on the thermal compressed foamed side, thereby eliminating the occurrence of clogging. The ink absorber (Comparative Example 6) formed of the felt member having the same shape is inferior in effect to the ink absorber in Inventive Example 5.

While the preferred embodiment has been described using specific terms, such description is for illustrative purposes only, and it is to be noted that changes and variations may be made without departing from the spirit or scope of the following claims.

What is claimed is:

1. An ink wastage absorber comprising a flexible polyurethane foam produced by using a foamable raw material containing a polyol, an isocyanate, a catalyst, and a foaming agent, wherein said flexible polyurethane foam is impregnated with a surface active agent, and wherein said surface active agent is a denaturated sodium succinate.

2. An ink wastage absorber according to claim 1, wherein said flexible polyurethane foam is a non-compressed foam.

3. An ink wastage absorber according to claim 1, wherein said flexible polyurethane foam is a compressed foam.

4. An ink wastage absorber according to claim 1, wherein said denaturated sodium succinate is impregnated in said flexible polyurethane foam in an amount of 1 to 500,000 g per 1 $m^3$ of said flexible polyurethane foam.

5. An ink wastage absorber according to claim 1, wherein said denaturated sodium succinate is impregnated in said flexible polyurethane foam in an amount of 1,000 to 20,000 g per 1 $m^3$ of said flexible polyurethane foam.

6. An ink waste absorber according to claim 1, wherein the density of the flexible polyurethane foam is set in a range of from 0.005 to 0.150 $g/cm^3$.

7. An ink waste absorber according to claim 1, wherein the density of the flexible polyurethane foam is set in a range of from 0.01 to 0.05 $g/cm^3$.

8. An ink waste absorber according to claim 1, wherein the number of cells of the polyurethane foam is set in a range of from 40 to 150 pieces/25 mm.

9. An ink waste absorber according to claim 1, wherein the number of cells of the polyurethane foam is set in a range of from 60 to 150 pieces/25 mm.

10. An ink waste absorber according to claim 3, wherein the compression magnification is set in a range of from 2 to 20 times.

11. An ink waste absorber according to claim 3, wherein the compression magnification is set in a range of from 8 to 10 times.

12. An ink waste absorber for pigment or dye ink comprising a flexible polyurethane foam having an air-permeability of 1.0 $cc/cm^2/sec$ or more, wherein the ink wastage absorber is made from a plurality of layers different in air-permeability, wherein the plurality of layers are stacked such that the ink absorptivity becomes higher at a position closer to the ink absorbing side and the ink supporting ability becomes higher at a position farther from the ink absorbing side.

13. An ink waste absorber for pigment or dye ink comprising a flexible polyurethane foam having an air-permeability of 1.0 $cc/cm^2/sec$ or more, wherein the ink absorptivity of the ink wastage absorber is enhanced by slitting the surface, on the ink absorbing side.

* * * * *